UNITED STATES PATENT OFFICE.

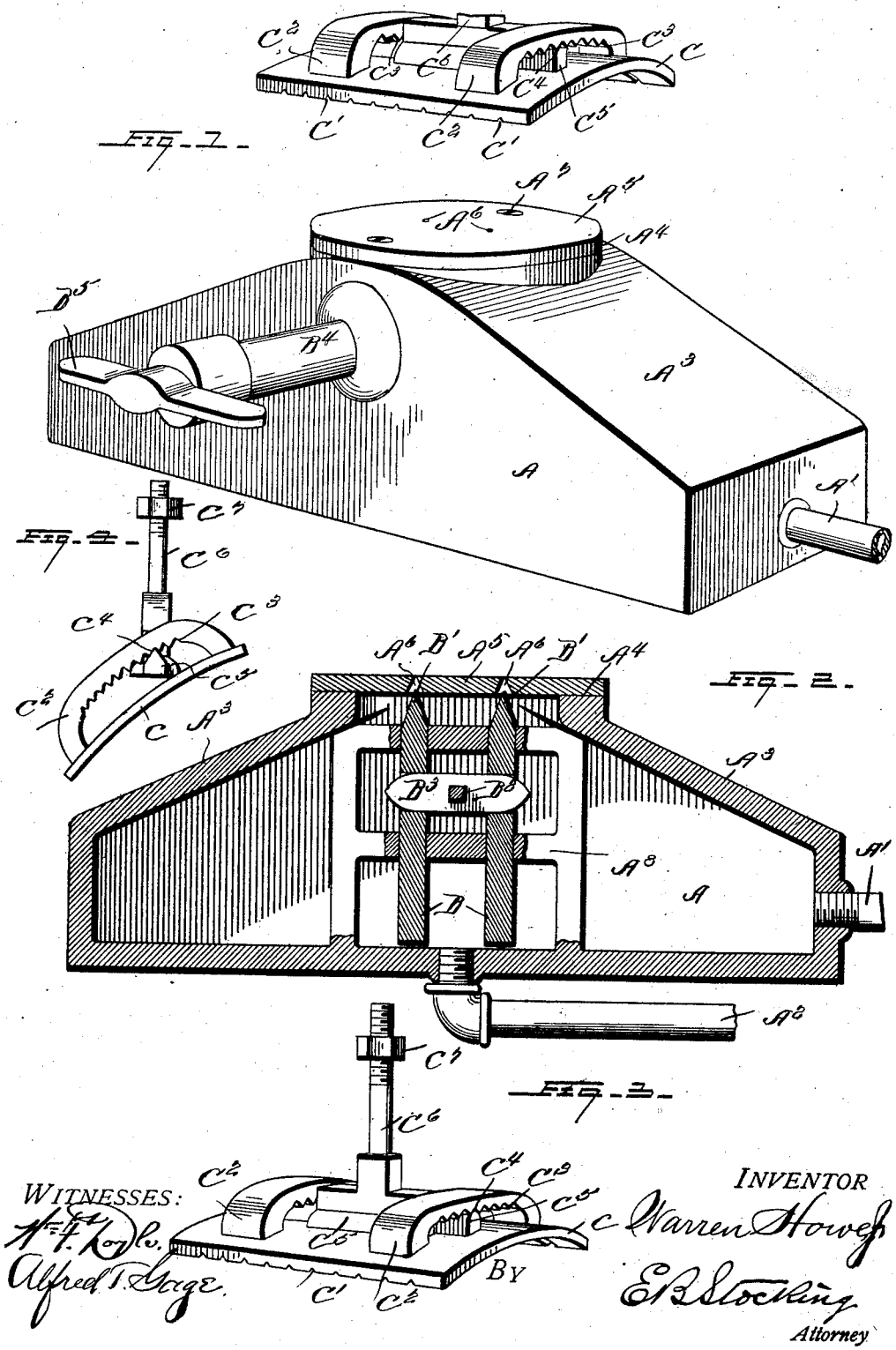

WARREN HOWE, JR., OF VISALIA, CALIFORNIA.

OIL-BURNER.

No. 859,450.     Specification of Letters Patent.     Patented July 9, 1907.

Application filed October 12, 1905. Renewed December 22, 1906. Serial No. 349,164.

*To all whom it may concern:*

Be it known that I, WARREN HOWE, Jr., a citizen of the United States, residing at Visalia, in the county of Tulare, State of California, have invented certain new and useful Improvements in Oil-Burners, of which the following is a specification, reference being had therein to the accompanying drawing.

This invention relates to an oil burner, and particularly to a deflector adapted to coöperate with the burner.

The invention has for an object to provide for an improved construction and arrangement of cleaners for the burner openings and also means for supporting and adjusting the position of the deflector plate disposed about said burner so as to confine the flame as is necessary for heating purposes.

Other and further objects and advantages of the invention will be hereinafter set forth and the novel features thereof defined by the appended claims.

In the drawing:—Figure 1 is a perspective of the burner and deflector; Fig. 2 is a longitudinal section of the burner; Fig. 3 is a detail perspective of the deflector, and Fig. 4 is a side elevation thereof.

Like letters of reference refer to like parts throughout the several views of the drawing.

The letter A designates a burner casing which may be of any desired construction or configuration and is provided with a supply pipe A' at one end thereof and a draw off pipe $A^2$ at its lower portion for the removal of the sediment therein. The upper portion of this burner is provided with inclined faces $A^3$ terminating in a horizontally disposed portion $A^4$ upon which the cap plate $A^5$ is disposed and provided with burner openings $A^6$. This plate may be secured in position by any desired means, for instance, by screws $A^7$, as shown in Fig. 1. Within the burner casing the supporting frame $A^8$ is provided and the cleaning valves or rods B mounted to reciprocate freely therein. These rod valves are provided with reduced or sharpened upper portions B' adapted to pass through the burner openings to clear them of any obstruction therein, and also to completely close one of said openings when it is not desired to use the same. For the purpose of reciprocating these valves a rock shaft $B^2$ is pivotally mounted in the casing and provided with a lever $B^3$ disposed in suitable openings or slots within the members B so that in its oscillation the cleaners are forced through either one or the other of the openings. This rock shaft extends through the side of the burner casing and through a suitable tube $B^4$ by which it is protected from the heat and carried to a point removed from the burner where an operating handle $B^5$ is applied thereto, as shown in Fig. 1.

The deflector comprises a curved or segmental plate C having its concaved face above the burner openings $A^6$ and provided with a series of grooves C' extending across the inner face thereof so as to deflect the flame and convect the heat toward each side. Upon the upper or convexed face of this plate parallel yokes $C^2$ are disposed at opposite ends and provided upon their under faces with a series of teeth or sockets $C^3$ adapted to engage an angular edge $C^4$ carried by the supporting bar $C^5$ which extends beneath the edge of the yokes and is provided intermediate of its ends with a bolt $C^6$ threaded and provided with a holding nut $C^7$ by which it may be attached to a stove lid or any suitable support.

In the use of the invention with crude or other oil the burner casing is preliminarily heated by igniting oil thereon, and as soon as this heat generates gas within the casing it ascends upward and passes through the burner openings where it ignites and the flame comes into contact with the deflector plate and the heat turned in either direction as found desirable. The deflector plate may be adjusted at different angles relative to a horizontal or vertical plane by engaging the teeth upon the yoke at different sides thereof, for instance as shown by Fig. 4, so that the flame may be directed toward the front of a stove if desired, or when in a horizontal plane, as shown in Fig. 1, to throw the flame down upon the burner itself so as to increase the heat thereon. If either of the burner openings becomes clogged as frequently happens in this class of burner, the valves may be alternately operated by the handle so as to clean the burner openings, only one of which is extinguished at a time owing to the alternate operation of these valves or rods. If the heat generated by the burner becomes too great, it may be reduced by closing one of the burner openings.

It will be obvious that the construction embodied herein comprises a simple, economical and efficient construction of parts by which the gas generated from the oil may be burned as a fuel and the flame which ascends from such burner by the gas pressure therein properly deflected and spread so as to heat both the surface of the burner and the stove or other inclosure within which the burner is placed.

Having now described my invention and set forth its merits what I claim and desire to secure by Letters Patent is:—

1. In an oil burner, a casing provided with a plurality of burner openings in one face thereof, a plurality of valve or cleaner rods mounted to reciprocate in parallel planes within said casing, and a centrally pivoted rock shaft having arms at its opposite sides connected to said rods to alternately project the same through the burner openings.

2. In an oil burner, a casing provided with a plurality of burner openings in one face thereof, a plurality of valve or cleaner rods mounted to reciprocate in parallel planes within said casing, a centrally pivoted rock shaft having arms at its opposite sides connected to said rods to alternately project the same through the burner openings, a tubular casing extending laterally from the burner casing within which said rock shaft is disposed, and an operating handle for the rock shaft at the extended end of said tubular casing.

3. A deflector plate provided with a yoke upon its upper face, a supporting bar, and means carried by said bar for adjustably supporting the yoke therefrom at either side of the center of said yoke.

4. A segmental deflector plate provided with recessed yokes upon its upper face, a supporting bar extending beneath said yokes and provided with an angular edge to enter the recesses therein, and a securing bolt extending from said bar.

5. A segmental deflector plate provided with recessed yokes upon its upper face, a supporting bar extending beneath said yokes and provided with an angular edge to enter the recesses therein, a securing bolt extending from said bar, and a series of laterally disposed grooves extending across the concave face of said plate.

In testimony whereof, I affix my signature in presence of two witnesses.

WARREN HOWE, Jr.

Witnesses:
  MAURICE E. POWER,
  LORA PARKER.